Jan. 2, 1962 N. W. MADILL 3,015,471
SPAR TREE
Filed April 9, 1958 3 Sheets-Sheet 1

NORMAN WESLEY MADILL

BY: Cushman, Darby + Cushman
ATTORNEYS

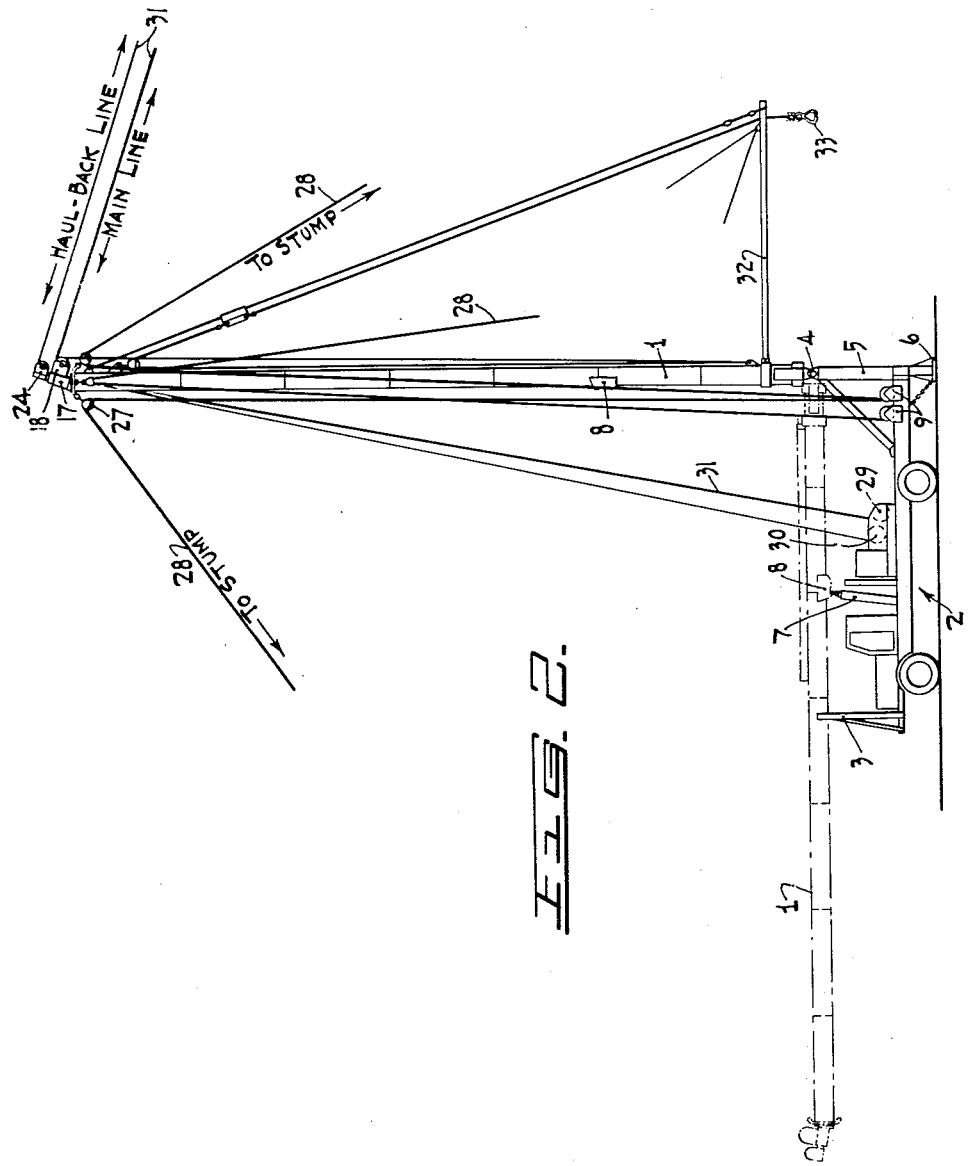

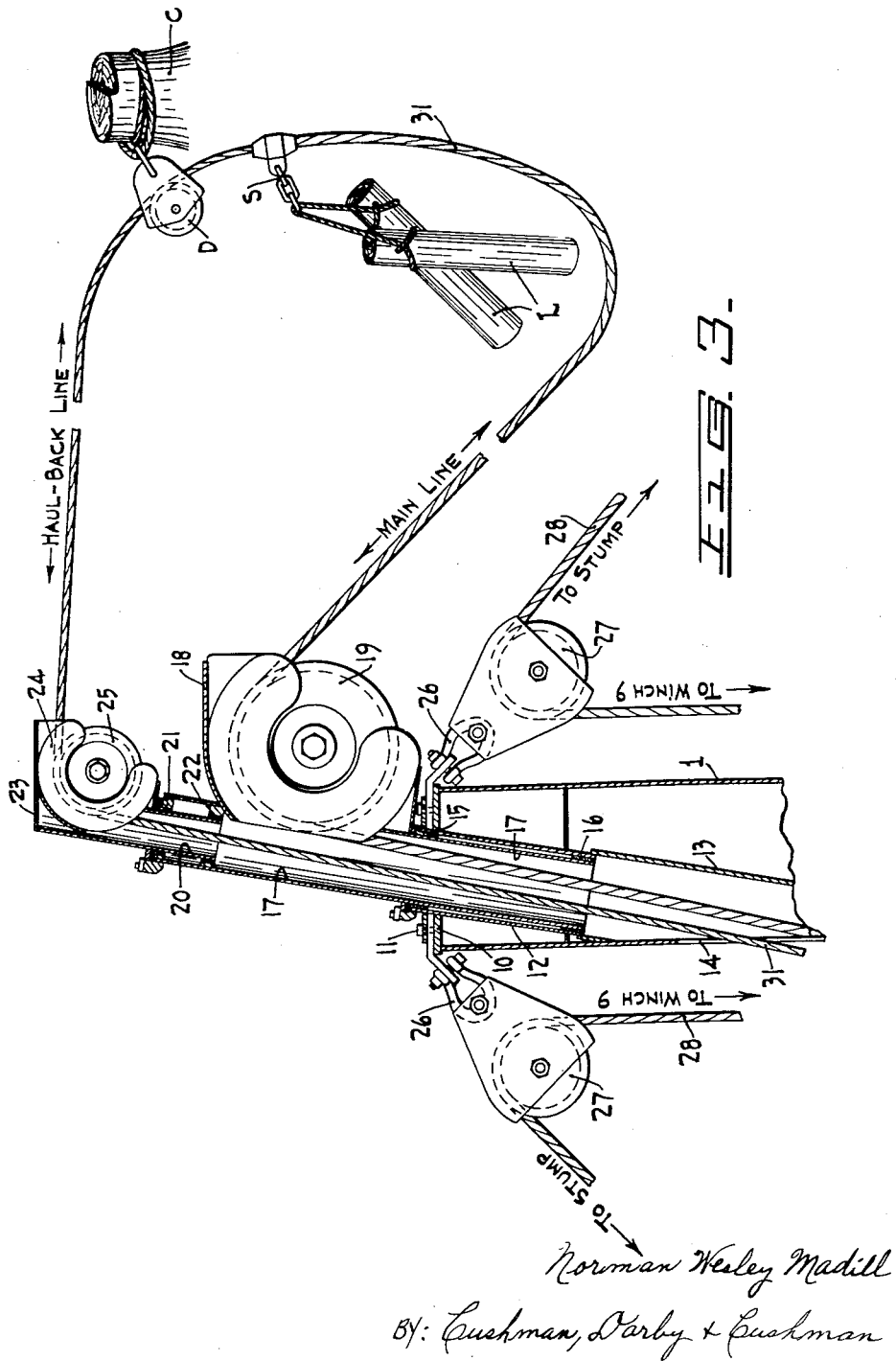

United States Patent Office 3,015,471
Patented Jan. 2, 1962

3,015,471
SPAR TREE
Norman W. Madill, 62 Arena St., Nanaimo,
British Columbia, Canada
Filed Apr. 9, 1958, Ser. No. 727,342
Claims priority, application Canada Feb. 4, 1958
2 Claims. (Cl. 254—139.1)

This invention relates to logging equipment and more particularly to spar trees.

As will be appreciated, the selection and felling of trees is merely the first stage of a chain of complex operations required before the timber can be transported to its intended destination.

Before felling takes place, a number of factors have to be determined, firstly the lean of a tree must be taken into account as this influences the choice of direction of fall; secondly, the fall of a tree must avoid another standing tree; thirdly, a spot must be selected for the fall of the tree so as not to damage it by striking rocks or like projections from the ground; and finally the simplification of skidding work, and it is the latter with which the present invention is concerned.

Skidding, in simple terms, is the application of hauling all fallen timber in a given radius to one central collection point from whence it can be loaded and transported away from the felling area.

Skidding is normally achieved by means of spar trees which are either mobile in two directions due to the spar trees being mounted on railway tracks, or by choosing a natural growing tree of sufficient height, say 280 feet, and thereafter topping, say 80 feet, from said tree. In either case, the spar tree, or head spar tree as it is sometimes called, is, in effect, a perpendicular column with its peak supporting various tackles.

The object of the spar tree is, by means of its supporting tackle, to haul logs felled within a given radius from the spar tree to the base of the latter which thereby serves as a central collecting and loading point. Obviously, due to the mobile artificial spar tree being mounted on a rail track, its movement to another site is governed by the direction of said track, and when a natural growing spar tree is involved, its useful life is governed by the log collecting radius.

Thus, the usefulness in both cases is limited and in particular when the natural spar tree is employed, much wastage of labour is encountered because when the location of the collecting site is to be moved and a new spar tree to be selected, all the tackle and guying supports must be dismantled and then erected at the new given site. Whilst this is occurring, the actual logging labour is at a standstill.

Moreover, another disadvantage with known types of spar trees, over and above the mobility aspect, is that the tackle is only capable of collecting logs within a given sector due to neither type of known spar tree giving an all round 360 degrees pivotable movement to said tackle. Obviously, this is a distinct disadvantage because, when all logs within the given sector have been collected at the base of the spar tree, labour must be sent aloft in order that the arc of movement of the tackle can be varied thereby to clear a further sector utilizing the spar tree as the centre of radius.

Thus the object of the invention is to provide a spar tree on a carriage capable of the utmost mobility in any desired direction to cater for variation in collecting sites as well as permitting the log-collecting tackle a full 360 degree arc of movement once erected on the site.

The invention is illustrated in the accompanying drawings in which

FIGURE 2 is a diagrammatic illustration of the present invention; and

FIGURE 3 is a part-sectional detail view of a portion of FIGURE 2 on an enlarged scale.

Figure 1:
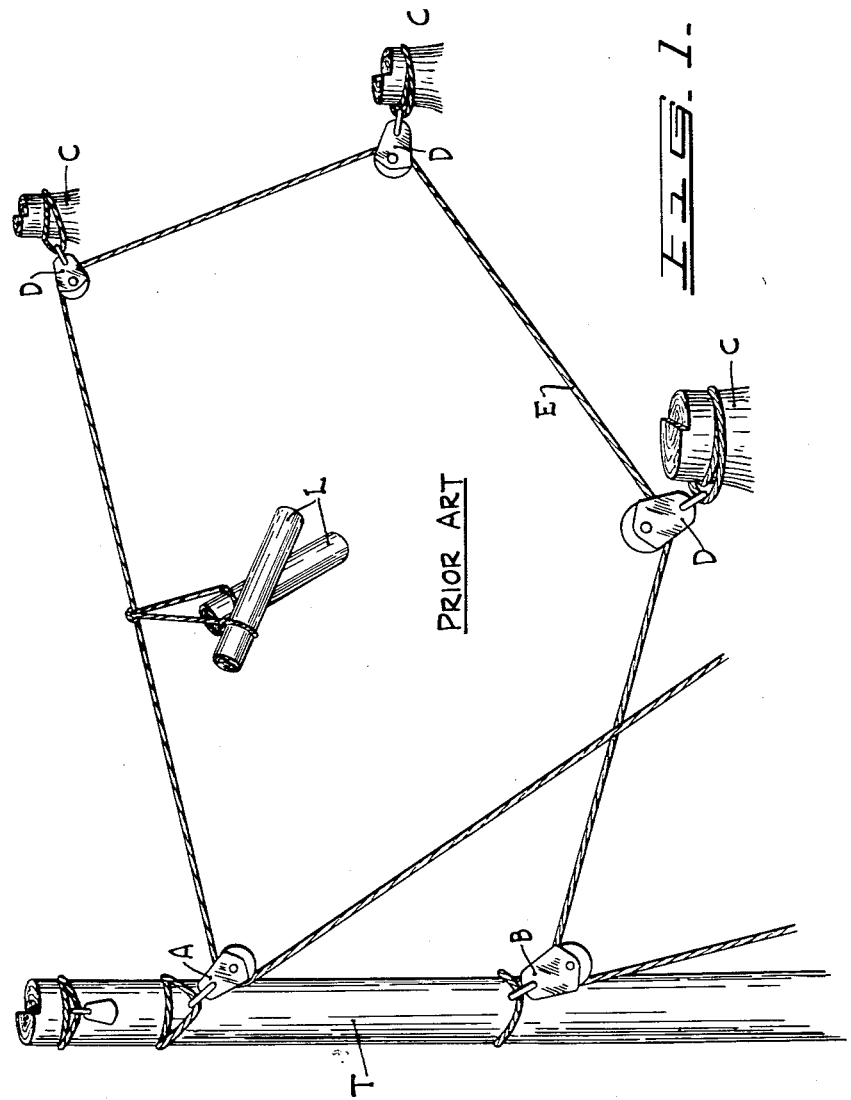
FIGURE 1 is a diagrammatic illustration of prior art utilizing a natural growing spar tree.

Referring firstly to FIGURE 1 which is a diagrammatic illustration of known prior art utilizing a natural growing spar tree, it will be seen that the tree T chosen as the spar tree is equipped with upper and lower blocks and tackle A, B respectively. Adjacent stumps C of other trees each have a sheave D lashed securely thereto.

In the art, the upper block and tackle A is known as a high-lead block whilst the lower block and tackle B is known as a head-trip block, the sheaves D being known as haul-back blocks.

It will be seen that a continuous cable E passes through all blocks and sheaves and the felled logs L are secured to the cable E and are thereby hauled to the spar tree from their felled position. From a glance at FIGURE 1, it will be obvious that this natural growing spar tree has, amongst others, a disadvantage that there must be a constant rearrangement of the cables and co-operating sheaves if a wide area of land is to be cleared satisfactorily and once this has occurred, the entire apparatus must be dismantled by hand. After a new site and fresh spar tree has been chosen, it is then necessary for the apparatus to be rigged yet again.

The present invention is shown in FIGURES 2 and 3 and from FIGURE 2 it will be seen that the mobile spar tree includes a main hollow tubular boom 1 supported on a wheeled vehicle indicated generally at 2, the travelling position of said spar tree being indicated in FIGURE 2 by the chain lines and its erected or operative position being indicated by the full lines. As will also be seen from FIGURE 2, the boom 1, when in its travelling position, is supported by a cradle 3 located at the forward end of the vehicle 2 and is hingeably connected at 4 to a rear support 5 upstanding from the rear end of said vehicle, said rear support 5 being provided with a base plate 6 capable of being raised or lowered into engagement with the ground. Located on the vehicle 2 between the cradle 3 and rear support 5, is a telescopic hydraulic jack 7 having its upper end in engagement with a strap 8 fast on outer periphery of the hollow boom 1.

Thus, when the vehicle has reached the desired site, the operator brings about the lowering of the base plate 6 to enable the chassis of the vehicle 2 to become perfectly level and thereafter actuates the telescopic jack 7 to raise the boom until it reaches an angle of 45 degrees to the horizontal.

Referring more particularly to FIGURE 3, it will be seen that the upper end of the boom 1 is closed by means of an end plate 10 having a central aperture the axis of which is disposed at a predetermined angle to the axis of the boom 1.

Coaxially disposed within the aperture formed in the end plate 10 and secured thereto by bolts 11 is a first sleeve 12 which, at its lower end, is fast with a stub sleeve 13 terminating in an aperture 14 formed in the side wall of the boom 1.

Disposed within the first sleeve 12, and located at its upper and lower ends, are bronze bearings 15, 16 respectively, and coaxially disposed within said bearings 15, 16 and mounted for independent axial relative rotation with respect to said first sleeve 12, is a second sleeve 17, a predetermined length of said second sleeve 17 projecting beyond the end plate. From reference to FIGURE 3 of the drawings, it will be seen that the portion of the second sleeve 17 projecting from beyond the end plate 10 is provided with a casing 18 within which a main-line sheave 19 is free to rotate about its axis, said sheave communicating with the interior of said second sleeve 17.

Located within the upper or outer end of the second sleeve 17 and eccentrically mounted therein, for independent axial relative rotation with respect to the second sleeve 17, is a third sleeve 20 adapted to rotate within upper and lower bronze bearings 21, 22 respectively, disposed about the outer periphery of said third sleeve 20 located between the latter and the inner periphery of the upper or outer end of the second sleeve 17.

The upper end of the third sleeve 20 is closed, as at 23, and is provided with a housing 24 within which a haul-back line sheave 25 is free to rotate about its axis. Secured, by means of eyelets 26 to the end plate 10 of the boom 1, are a plurality of guy-line sheaves 27 around each of which a guy-line 28 is adapted to pass.

Thus, whilst the boom 1 is being raised by the hydraulic jack 7 to an angle of 45 degrees with respect to the horizontal, one end of each guy-line 28 is being made fast to an adjacent tree stump. Each guy-line 28, after passing around its associated sleave 27, is led to its own hydraulic guy-line winch 9 (see FIGURE 2) and when power is applied to said winches 9 by the operator of the vehicle, the boom 1 will be raised from its 45 degree position with respect to the horizontal, through a full 90 degree movement until its axis is at right-angles to the ground. The guy-lines 28 thereby provide a ready means for maintaining true vertical adjustment of the boom 1 at all times.

Located aft of the hydraulic telescopic jack 8 are a further pair of hydraulic winches 29, 30 (see FIGURE 2) each of which have an opposite end of a cable 31 secured thereto. This last mentioned cable passes from winch 29 upwardly and through aperture 14 (see FIGURE 3) into the bore of the stub-sleeve 13, and bore of the second sleeve 17, around the sheave 19 mounted on said second sleeve 17, out through the casing 18 and downwardly away from the upper or outer end of the boom 1.

The cable 31 then passes around one or more sheaves each secured to selected adjacent tree stumps, the co-operation of said last-mentioned sheaves and stumps being similar to the co-operation of the sheaves D and stumps C shown in FIGURE 1. After passing around said sheaves D, the cable then passes upwardly towards the upper or outer end of the boom 1, around the haul-back line sheave 25 mounted on the upper end of the third sleeve 20, down through the bores of the sleeves 20 and 17, as well as the bore of the stub-sleeve 13 and thence, through the aperture 14 in the periphery of the boom 1, outwardly and downwardly to the hydraulic winch 30. The felled logs L are secured by means of any suitable shackle S to the cable 31.

It will be appreciated by those skilled in the art, that the portion of the cable 31 extending between the hydraulic winch 29 and the shackle S is known as the main-line, whereas that portion of the cable 31 extending between the shackle S and the hydraulic winch 30 is known as the haul-back line.

Thus, as the haul-back sheave 25 and main-line sheave 19 are both located above any obstruction presented by the guy-lines 28 and associated sheaves 27, and as the sleeves 20 and 17 respectively associated with said haul-back sheave 25 and main-line sheave 19 are capable, through the bronze bearings, of independent axial relative rotation with respect to one another, logging operations can be conducted through a full 360 degree arc due to the 360 degree possible orientation of the axis of each sheave 19 and 25, each said axis being in a plane disposed at an angle to the vertical axis of the boom.

The invention also incorporates a loading boom 32 for use with said spar tree which is hingeably connected, at one end, to the boom 1 and supported, at the other end, by any suitable guy-line, said loading boom incorporating loading tongs 33. It will be appreciated that although the vertical axes of the co-operating sleeves are disposed at an angle to the vertical axis of the boom, it is within the scope of the invention for all the said vertical axes to be coaxial with one another.

In this way, it is possible for the cable 31 to be led downwardly to the winches 30 throughout the majority of the bore of the boom 1 and thence, after passing around suitable pulleys located at the base of the boom, through an aperture in the periphery of said boom, similar to aperture 14, to the winches 29, 30.

I claim:

1. A spar tree including a main boom vertical to the ground; a plurality of guy-lines connected to the upper end of said boom; upper and lower primary sheaves each free to rotate about its own axis; an upper mounting sleeve for said upper primary sheave; a lower mounting sleeve for said lower primary sheave; a portion of said lower sleeve being rotatably mounted on bearings within the upper end of said boom and extending upwardly therefrom, a portion of said upper sleeve being rotatably mounted on bearings within the upper end of said lower sleeve and extending upwardly therefrom, whereby said upper and lower primary sheaves are disposed above all of said guy-lines, said bearings mounting said sleeves to be independently and freely rotatable about parallel and closely adjacent axes, said upper and lower sleeves each being rotatable in their bearings through 360°; and an adjustable loop cable passing over said primary sheaves for hauling articles to a position adjacent the base of said boom, said loop cable including a haul-back line passing over said upper primary sheave, and a main line passing over said lower primary sheave, said haul-back line and said main line passing through the interior of said sleeves, each end of said cable being anchored to an associated cable winch.

2. A spar tree according to claim 1 wherein the axes of said sleeves are inclined with respect to the vertical axis of said boom.

References Cited in the file of this patent

UNITED STATES PATENTS

| | | |
|---|---|---|
| 1,657,187 | Whittlesey | Jan. 24, 1928 |
| 2,694,474 | Meany | Nov. 16, 1954 |
| 2,734,641 | Burton | Feb. 14, 1956 |
| 2,782,939 | Bernaerts | Feb. 26, 1957 |
| 2,883,068 | McIntyre | Apr. 21, 1959 |
| 2,985,429 | LeTourneau | May 23, 1961 |